United States Patent [19]

Artweger et al.

[11] 4,295,679
[45] Oct. 20, 1981

[54] VAN STRUCTURE

[75] Inventors: Wolfgang Artweger, Windischgarsten; Walter Freller, Sierning, both of Austria

[73] Assignee: "Wohn-Art" Freizeitartikel Gesellschaft m.b.H., Windischgarsten, Austria

[21] Appl. No.: 58,184

[22] Filed: Jul. 17, 1979

[30] Foreign Application Priority Data

Jul. 20, 1978 [AT] Austria ................. 5293/78

[51] Int. Cl.³ ............................................. E04B 1/346
[52] U.S. Cl. ................................................ 296/171
[58] Field of Search ............... 296/171, 172, 26, 176, 296/173; 52/67; 280/789

[56] References Cited

U.S. PATENT DOCUMENTS

| 2,733,095 | 1/1956 | Crivella | 296/171 X |
| 2,990,214 | 6/1961 | Watson | 296/171 |
| 3,181,910 | 5/1965 | Thomas | 296/171 X |
| 3,212,810 | 10/1965 | Bass | 296/171 |
| 4,103,462 | 8/1978 | Freller | 296/171 X |
| 4,133,571 | 1/1979 | Fillios | 296/171 X |

Primary Examiner—Joseph F. Peters, Jr.
Assistant Examiner—Norman L. Stack, Jr.
Attorney, Agent, or Firm—Kurt Kelman

[57] ABSTRACT

A van structure comprises an open-ended box-like main cabin, two box-like extension cabins received in a respective open end of the main cabin, longitudinally extending cable drives along the side walls of the main cabin and trained over pulley arrangements for slidingly guiding and moving the extension cabins for sliding movement relative to the main cabin and to each other whereby the extension cabins may be telescopingly moved into and out of the main cabin, and a utility unit in the main cabin centered between the opposite ends thereof and dividing the main cabin into two compartments adjacent the respective extension cabins, the utility unit defining a space with one of the side walls of the main cabin sufficient to permit passage of a person and including two load-bearing carrier elements spaced from each other in a longitudinal direction and facing the two open ends, the pulley arrangements being anchored to the carrier elements and the carrier elements being capable of sustaining the tensile force of the cable drives, a wash room facility, a kitchen facility and a storage facility.

24 Claims, 9 Drawing Figures

VAN STRUCTURE

The present invention relates to a van structure comprising a box-like main cabin having a floor, two side walls and a roof, the opposite ends of the main cabin being open, two box-like extensions cabins each having a floor, two side walls, a roof and an end wall interconnecting the side walls, an open end of each extension cabin opposite the end wall thereof being received in a respective one of the open ends of the main cabin, and longitudinally extending guide means slidingly guiding the extension cabins for sliding movement relative to the main cabin and to each other whereby the extension cabins may be telescopingly moved into and out of the main cabin.

Van structures of this type have been used, for example, as mobile homes. In such van structures, the interior room defined by the floors, side walls, roofs and end walls of the cabins may be changed in length by the relative movement of the extension cabins. When used as a mobile home, the interior room length is relatively difficult to change between an extended operating position of the extension cabins and a collapsed transport position thereof without extensive rearrangement of the furniture and living facilities in the room.

In the collapsible mobile home van structure disclosed in U.S. Pat. No. 4,103,462, dated Aug. 1, 1978, beds are arranged in the interior room which automatically fold and extend upon decreasing and increasing the size of the room. The van structure comprises a main cabin telescopingly receiving in its open end an extension cabin. The size of the interior room is decreased and increased by respectively moving the extension cabin into and out of the main cabin, a special cable drive trained over pulleys in a zigzag arrangement being provided for moving the extension cabin. The folding and extension of the beds require an increased moving force. Furthermore, considerable difficulties are encountered in building into such van structures the required conduits for supplying water, heat, gas and electricity to the interior room, as well as sanitary facilities. If bottled gas is used as an energy source, official safety regulations often prevent or severely restrict the utilization of long flexible conduits for supplying the gas. To provide sufficient access of air to such bottles of gas, they are often stored in a special protective housing above the axle of the undercarriage on which the van structure moves. Generally, the kitchen facility in such mobile homes is arranged in the center region thereof and the supply of operating power thereto causes manifold problems.

U.S. Pat. No. 2,990,214, dated June 27, 1961, discloses a vertically collapsible van with two partitions at the center of the van, which may be pivoted between a collapsed and erected position for supporting an upper section of the van at different heights on a lower section of the van. The partitions may define spaces to be used for storage and are spaced from each other in a longitudinal direction, such permanent fixtures as cooking and toilet facilities being arranged between the two partitions. The collapsible partitions extend from side wall to side wall of the two van sections and collapse when subjected to a tensile force in the longitudinal direction.

It is the primary object of this invention to provide a van structure with an interior room which may be changed in length readily and simply with a minimum of no change in the arrangement of the interior fixtures and energy supply lines whereby the length of the van structure may be readily adapted to desired operating conditions.

In a van structure of the first-described type, this is accomplished according to the invention with a utility unit in the main cabin centered between the opposite ends thereof and constituting a vertically extending separation substantially parallel to the opposite open ends and dividing the main cabin into two compartments, the utility unit defining a space with one of the side walls of the main cabin. The utility unit includes two load-bearing carrier elements affixed to the main cabin and spaced from each other in a longitudinal direction and facing the two open ends of the main cabin and moving means for moving the extension cabins out of the main cabin under a tensile force are anchored to the carrier elements. The carrier elements are capable of sustaining the tensile force. The utility unit also includes a wash room facility, a kitchen facility and a storage facility.

The indicated provision and arrangement of the utility unit in this type of van structure unexpectedly makes it possible to reduce the number and length of energy supply lines as well as any repositioning of the interior fixtures to a minimum when the length of the interior room is increased or decreased by the telescoping sliding movement of the extension cabins. Nevertheless, this arrangement assures proper functioning of the utility unit in the transport position of the extension cabins, i.e. when the same are moved completely into the main cabin, so that the unit can be used while the van structure travels as well as when it is at rest and the extension cabins are moved out for increasing the length of the interior room. At the same time, when an undercarriage mounts the van structure below the utility unit for wheeled movement, the structure has an advantageous central point of gravity provided by the heavy fixtures used for utility units in camping vans and the like. Since the moving means for the extension cabins is anchored to carrier elements which are affixed to the side walls and roof of the main cabin, which carrier elements support transverse walls wherebetween the wash room facility of the utility unit is arranged, the longitudinal guidance and movement of the extension cabins is well integrated in the interior room of the van structure and causes no obstruction, structural elements required for anchoring the longitudinal guide and moving means serving at the same time as essential parts of the utility unit. In the preferred embodiment, moreover, the transverse walls of the utility unit serve as partitions for separating the wash room facility from the rest of the interior room.

The above and other objects, advantages and features of the present invention will become more apparent from the following detailed description of certain now preferred embodiments thereof, taken in conjunction with the accompanying drawing wherein FIG. 1 is a perspective view of a van structure according to a preferred embodiment of this invention, with the side walls and roof transparent to show the interior;

Figure 1:
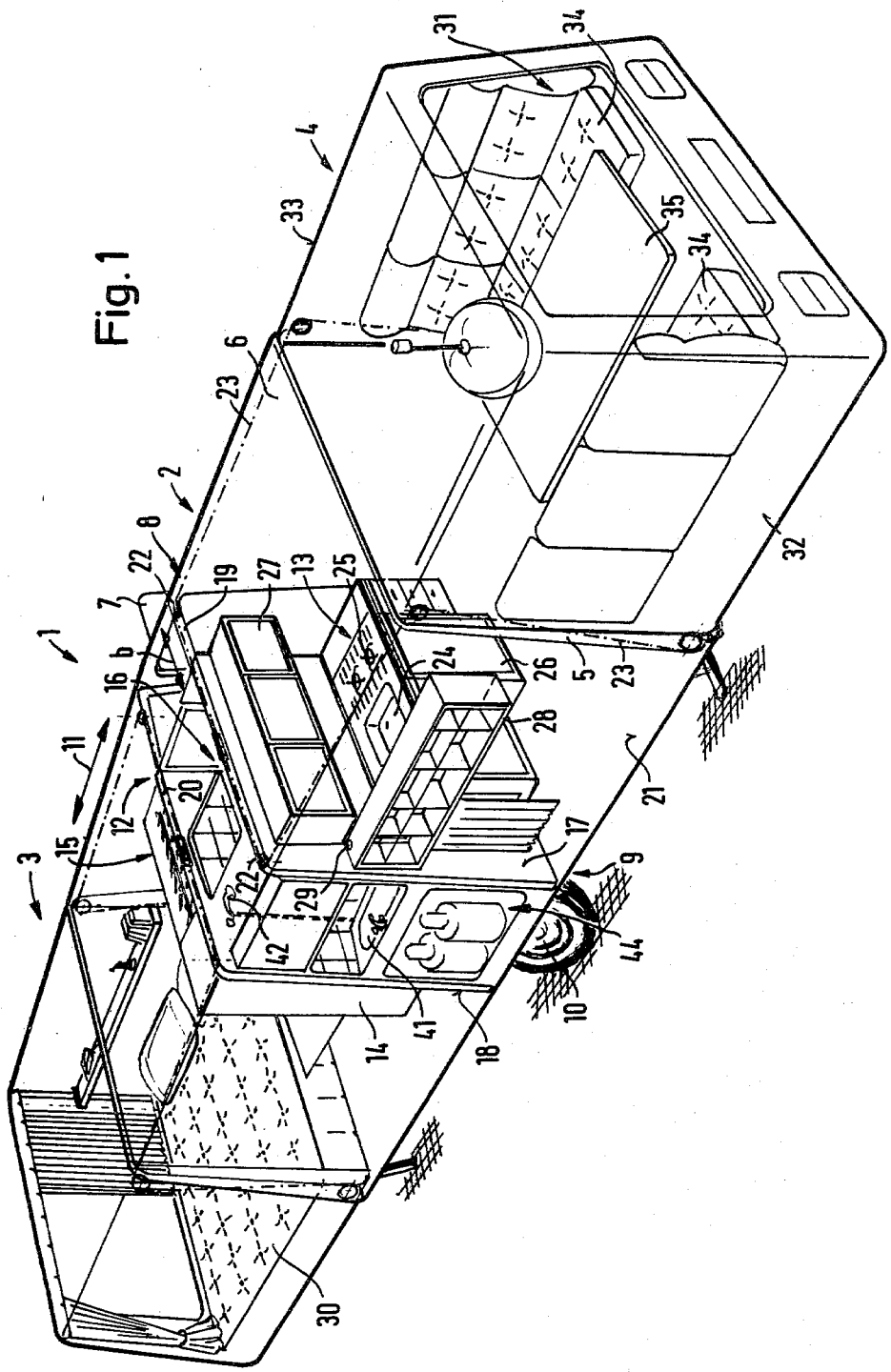

Referring now to the drawing and first to FIG. 1, van structure 1 is shown to comprise box-like main cabin 2 having floor 21, two side walls 5, 6 and a roof, opposite ends 43 of main cabin 2 being open, and two box-like extension cabins 3 and 4 each having a floor, two side walls 32, 33, a roof and an end wall interconnecting the side walls, an open end of each extension cabin 3, 4 opposite the end wall thereof being received in a respective one of the open ends of main cabin 2. The shell of the van structure is shown transparent to give an interior view of the structure and the fixtures arranged therein according to the invention. One side wall 6 of main cabin 2 has door 7 centered between the main cabin ends to provide access to the interior room of the van.

As shown only schematically and in connection with one of the extension cabins 4 (the other extension cabin being provided with the same means), longitudinally extending guide and moving means 8 slidingly guide the extension cabins for sliding movement relative to the main cabin and to each other whereby the extension cabins may be telescopingly moved into and out of the main cabin under a tensile force. In the illustrated embodiment, the guide and moving means comprise a pulley arrangement or each extension cabin over which a longitudinally extending cable drives are trained in a zigzag course, the special extension drive herein schematically shown being fully disclosed and claimed in U.S. Pat. No. 4,103,462, of which one of the joint inventors herein is the inventor.

As shown in chain-dotted lines, the flexible tensile elements or cables trained over each pulley arrangement extend longitudinally along side walls 4 and 5 of main cabin 2 and two load-bearing carrier elements 19, 20 affixed to the main cabin and spaced from each other in a longitudinal direction indicated by double-headed arrow 11 and facing the open ends of the main cabin have pulleys 22 of longitudinal guide and moving means 8 anchored thereto, the carrier elements being capable of sustaining the tensile force of cable drives 23 due to the force-transmitting connection of the carrier elements with the side walls and the roof of the main cabin. This construction has the advantage of making double use of the same structural elements for absorbing the extension forces and erecting the utility unit hereinbelow described in detail, thus reducing not only the weight of the van but also its cost.

Figure 4:
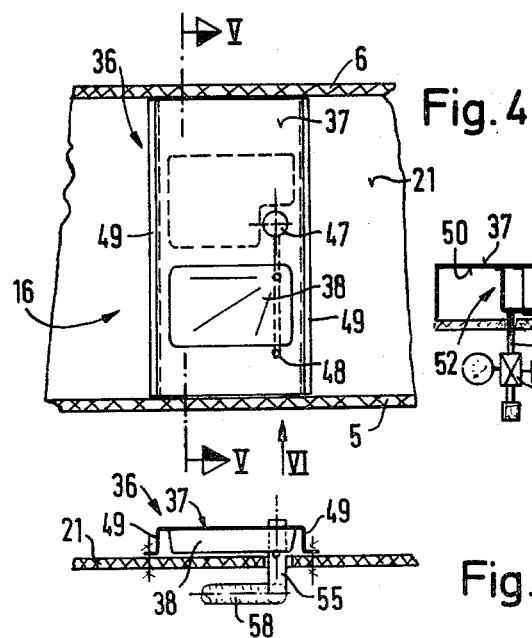
FIG. 4 is a fragmentary top view showing details of the wash room facility.

As shown, undercarriage 9 with its axle 10 supports main cabin 2 for wheeled movement and the undercarriage is arranged in vertical alignment with utility unit 12 and therebelow. As illustrated in FIG. 4, tractor 46, which may be a car, enables the van to be moved, means 45 coupling undercarriage 9 to tractor 46. This arrangement advantageously provides a centrally disposed point of gravity for the van structure in the transport and operating positions of the van, i.e. when the extension cabins are retracted or extended.

According to the invention, utility unit 12 is centered in the main cabin between opposite ends 43 thereof, this unit constituting a vertically extending separation substantially parallel to the opposite open ends and dividing main cabin 2 into two compartments. The utility unit defines a space with the one side wall 6 of the main cabin behind door 7 and sufficient to permit passage of a person. Width b of this space may be 50 cm, for example, thus permitting a person to pass from one compartment of the van into the other compartment and to permit a person entering through door 7 to pass through this space into either compartment or into the wash room facility, as will be described hereinafter. The utility unit of this invention includes not only the above-described load-bearing carrier elements for the longitudinally extending guide and moving means of the extension cabins but also wash room facility 16, kitchen facility 13 and storage facility 15. Transverse walls 17 and 18 are supported by carrier elements 19 and 20, the wash room facility being arranged between the transverse walls.

According to a preferred feature of the present invention, transverse walls 17 and 18 constitute rear walls for kitchen and storage facilities 13 and 15, respectively, the kitchen and storage facilities facing respective open ends 43 of main cabin 2. The storage facility includes closest arrangement 14 associated with transverse wall 18. In this manner, the load-bearing capacity of the transverse partition walls due to the fact that they are supported by load-bearing carrier elements 19 and 20 is effectively used for supporting closets and cabinets of other facilities of the utility unit, thus saving on additional load-bearing structural elements.

Illustrated closet arrangement 14, which is hung on transverse wall 18, is shown to include a shelf unit for storing underwear, bedding and the like, and a rod for hanging garments on hangers.

The kitchen and storage facilities are preferably spaced a sufficient distance from side walls 5, 6 of main cabin 2 to permit side walls 32, 33 of extension cabins 3, 4 to be received therebetween, the floors of the extension cabins being received between floor 21 of the main cabin and the kitchen and storage facilities when the extension cabins are retracted and the extension cabin roofs being received between the main cabin roof and the kitchen and storage facilities. By spacing kitchen and storage facilities 13, 14, 15 a distance from the side walls, floor and roof of main cabin 2 sufficient to permit the hulls of extension cabins 3, 4 to be accommodated between the hull of the main cabin and these facilities, the compartments in the main cabin may be fully utilized while permitting the van to be reduced to a minimum length during transportation by fully retracting the extension cabins into the main cabin without hindrance by the central utility unit. If the distance is sufficient for accommodating furniture respectively associated with side walls 32, 33 of extension cabins 3, 4 and with the kitchen facilities, such as illustrated seat 34 and cabinet bar 28, such furniture may remain in its operating position when extension cabin 4 is retracted without preventing retraction of the cabin to its fullest depth.

Figure 3:
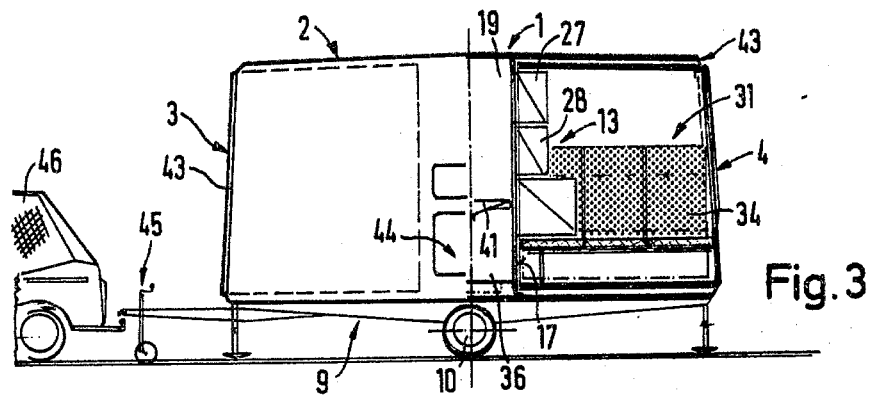
FIG. 3 is a side view of the van structure of FIG. 2, with the extension cabins retracted into the main cabin in the transportation position and the van structure shown hitched to a tractor vehicle.

As shown in the preferred embodiment, the length of each extension cabin in the longitudinal direction indicated by double-headed arrow 11 corresponds substantially to the distance between carrier elements 19, 20 and open ends 43 of main cabin 2 facing the same, thus providing the pleasing contour of the van illustrated in FIG. 3 when the extension cabins are fully retracted. Such an esthetic design may be of considerable importance to the buyer and improves the commercial value of the van structure. This distance may also exceed the length of the extension cabins in the longitudinal direction of the main cabin. Windows may be provided in side walls 32, 33 of the extension cabins, particularly in portions not moved into the main cabin, to improve the lighting of the interior room in the operating position of the extension cabins, i.e. when the interior room has been enlarged by pulling the extension cabins out of the main cabin.

Usefully, one extension cabin 4 contains seating furniture arrangement 31, 34 while the other extension cabin 3 contains sleeping furniture arrangement 30. The seating furniture arrangement comprises seats 31 and 34 mounted on side walls 32 and 33 of extension cabin 4, which are preferably convertible to beds. Table 35 is arranged between the seats. With this preferred arrangement, the compartments in the main cabin can be used for free movement of persons living in the van when the extension cabins are in their extended or operating position, i.e. these compartments are free from any obstruction by furniture, while the extension cabins may be retracted during transportation, when the van is not lived in, without disturbing the furniture in the extension cabins. With convertible seats 31 and 34 which extend along side walls 33 and 32 of extension cabin 4 and which may be unfolded and slid open to be converted into beds, more seating space is provided in the extension cabin than with a seating arrangement that extends transversely to the direction of extension and retraction of cabin 4. Furthermore, this seating arrangement permits table 35 to be arranged between the two laterally extending seats even in the retracted position of the extension cabin.

In the preferred embodiment herein shown, wash room facility 16 arranged between transverse partition walls 17 and 18 includes door 40 substantially parallel to side wall 6 of main cabin 2 and at distance b therefrom corresponding to the space sufficient to permit passage of a person, and wash basin 41 arranged adjacent other side wall 5 of the main cabin. Door 40 is opposite door 7 through which the van is entered from the outside. Kitchen facility 13 is arranged adjacent transverse wall 17 and projects into one of the compartments into which the main cabin is divided by utility unit 12, the kitchen facility including sink or dishwasher 24 constituting a dish washing means, stove 25 constituting a cooking means and refrigerator 26 constituting a food refrigerating means. Storage facility 15 includes a closet means 14 adjacent other transverse wall 18 and projecting into the other main cabin compartment. The location of door 40 gives ready access to the wash room facility and the opposite location of the wash basin very favorably uses the available space. The closet holding the bedding, underwear and garments of the persons using the van on one side of the utility unit and the kitchen furniture on the opposite side thereof provide a good weight balance assuring a more or less centered and symmetrical load on the central load-bearing elements.

As shown, the preferred kitchen facility further includes cabinet 27 mounted on transverse wall 17 above dish washing and cooking means 24, 25 for storing dishes, glasses and other kitchen implements. Furthermore, pivot 29 adjacent transverse wall 17 supports one end of cabinet bar 28 for pivoting the cabinet bar between the illustrated operating position wherein the cabinet bar extends along side wall 5 of the main cabin and a transport position (not shown) wherein the cabinet bar extends along transverse wall 17 between cabinet 27 and dish washing and cooking means 24, 25, the height of cabinet bar 28 being such that it fits in the space between cabinet 27 and the dish washer and stove therebelow. This arrangement makes it possible with little expense to provide a visually pleasing and useful furniture along the bare side wall 5 of the main cabin compartment when extension cabin 4 is extended while this furniture may be readily pivoted out of the decreased available space when the extension cabin is retracted partially or completely into the main cabin compartment.

It is useful, as shown, to include in the wash room facility a shower stall 38 and a water closet 39 arranged between wash basin 41 and door 40 providing access to wash room facility 16. This transverse series arrangement of all required components of the wash room facility in the utility unit between transverse partition walls 17, 18 makes most efficient use of the available space whether the extension cabins are in the extended or retracted position.

FIGS. 2 and 4–6 illustrate a particularly preferred arrangement of the wash room facility in more detail. As shown, integral structural unit 36 constituting load-bearing false floor 37 and support elements 49 supporting the false floor on floor 21 of main cabin 2 is positioned between transverse walls 17, 18. The main cabin floor and the false floor define a space therebetween. False floor 37 includes recessed area 38 constituting a floor for the shower stall and a shower head 42 is mounted above this recessed area on transverse wall 18. Water connection and fastening means 47, 48 for the water closet, the wash basin and the shower head are mounted on false floor 37. Water tank 52 and water conduit means connecting the water tank to the water connection means are arranged in the space between main cabin floor 21 and false floor 37.

Such a wash room facility can be pre-assembled as a complete module independent of the construction of the van and may then be built into the otherwise completed van, thus reducing the assembly time for the van construction. Also, such a wash room module may be mass-produced to exact specifications, thus providing standard units which may be used for ready replacement of damaged wash room units in existing vans. Furthermore, the space between the van floor and the false floor of the wash room facility is utilized for housing required structural components, thus further saving space and, in particular, housing the water tank inside the cabin so that it is protected from the ambient cold or heat. Where the false floor and its support elements form an integral unit, such a unit may be shaped from sheet metal, such as aluminum sheet, or molded from glass fiber reinforced synthetic resin, which materials provide the required load-bearing capacity.

Figure 5:
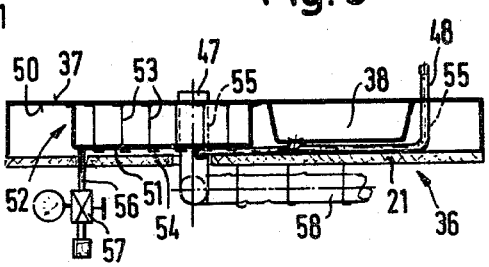
FIG. 5 is a sectional end view of the wash room facility along line V—V of FIG. 4.
Figure 6:
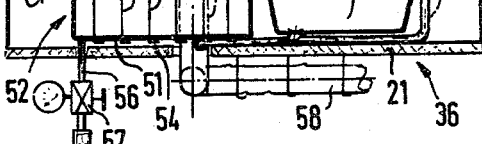
FIG. 6 is a similar fragmentary view along the line VI—VI of FIG. 4.

As best shown in FIG. 5, a portion of false floor 37 constitutes wall portions of water tank 52 adjacent recessed false floor area 38 and a plurality of spacing elements 53 affix bottom wall portion 51 of the water tank to the false floor portion. The spacing elements have one of their ends affixed to false floor 37 and opposite ends 54 thereof pass through bottom wall portion 51 and extend in contacting and support relationship therewith, being bent over 90° to support the bottom wall portion on the spacing elements. Bottom wall portion 51 is preferably integral with the side walls of water tank 52 and deformation of the bottom wall portion and the false floor under water pressure in the tank is prevented by the spacing elements which interconnect the same and whose bent-over ends 54 support the bottom wall portion. The spacing element ends are welded or otherwise strongly bonded to the bottom wall portion and the false floor, which also assures a fluid-tight seal for the bores through which spacing element ends 54 pass in bottom wall portion 51. As shown, water inlet and outlet conduits 55 are mounted on underside 50 of the false floor. Water supply conduit 56 leads into water tank 52 to deliver water thereto under pressure, pressure adjusting valve 57 being mounted in the water supply conduit. A manometer may be connected to the water pressure adjusting valve to permit adjustment of the water pressure. Conduits 55 are connected to flexible hose 58 which, as shown in FIG. 6, may be reeled and mounted on a bracket depending from main cabin floor 21. The length and diameter of hose 58 are so selected that it may carry the entire amount of water stored in tank 52, as well as a small water reserve for the water closet. At a suitable location, the waste water stored in this hose is then emptied into a sewer or any other available water disposal site. As shown in FIG. 6, water tank 52 extends over the entire width of false floor structure 36 so that support elements 49 may be used to form the side walls of the water tank.

As shown in FIG. 1, storage room 44 is arranged in the main cabin underneath wash basin 41 and is accessible through side wall 5 from the outside of van structure 1. The storage room contains portable energy sources for use in the van structure, such as bottled gas, storage batteries and the like. In this manner, the otherwise wasted space below the wash basin is utilized for the storage which would take up valuable space in the interior room of the van. This location has the added advantage of adding substantial weight above axle 10 of undercarriage 9, thus further favorably influencing the symmetrical balance of the van and improving traction.

Figure 2:
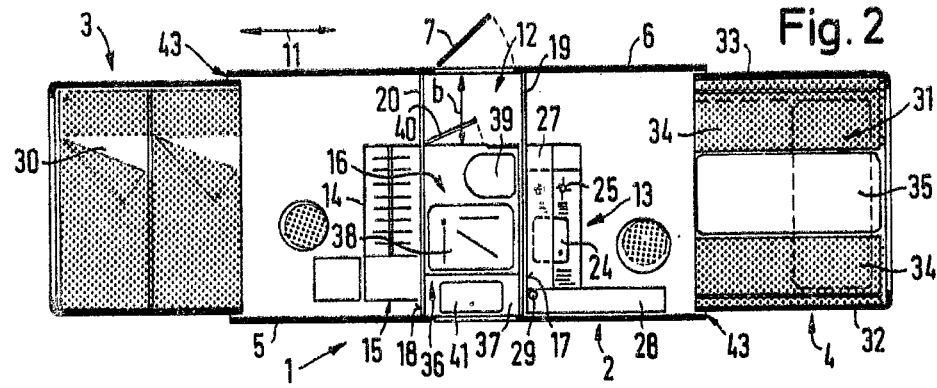
FIG. 2 is a top view of the van structure of FIG. 1, at a smaller scale.

While the top view of FIG. 2 shows van structure 1 in extended condition, the side view of FIG. 3 illustrates the van structure in its retracted or transport condition wherein extension cabins 3 and 4 have been fully telescoped into main cabin 2. As shown, the distance from transverse partition wall 17 (and 18) to open end 43 of the main cabin corresponds to the total retractable length of the extension cabin. Seating arrangements 31 and 34, with table 35, remain in place, cabinet bar 28 having been pivoted out of the way to permit seat 34 to fit between side wall 5 and the kitchen facility. After the adjustable supports for the van structure (descibed more fully hereinafter) have been retracted, coupling rig 45 extending from undercarriage 9 may be hitched to tractor vehicle 46 and the mobile home is ready for travel.

Figure 7:
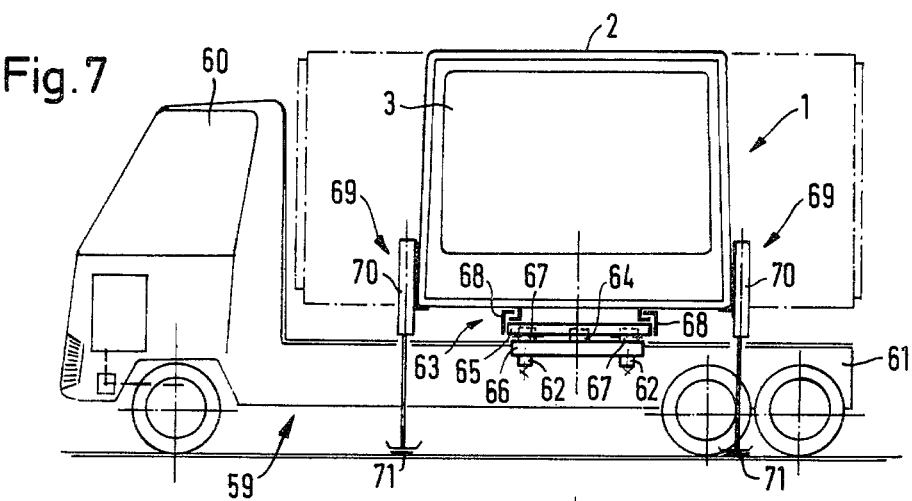
FIG. 7 is a schematic side elevational view, partly in section, of another embodiment of a van structure supported on a self-propelled vehicle chassis, showing the van structure in the transport position.
Figure 8:
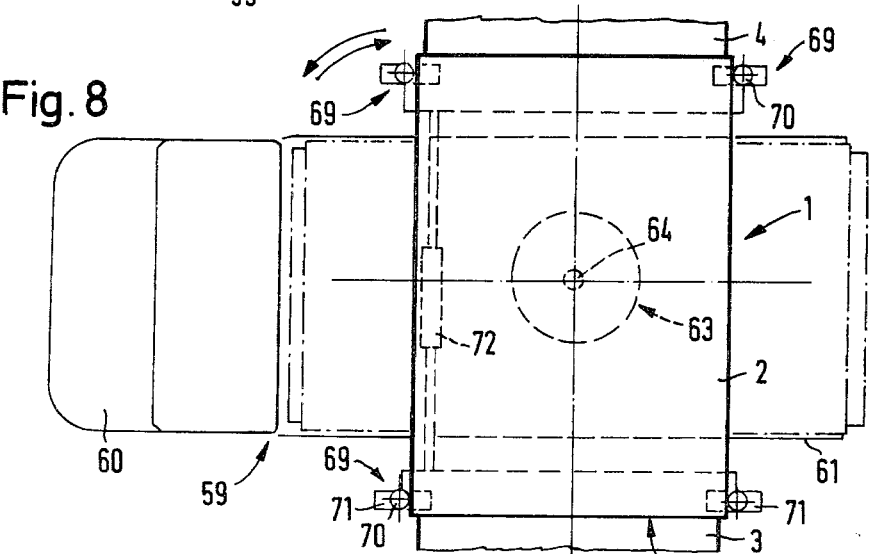
FIG. 8 is a top view of FIG. 7, showing the van structure in an operating position pivoted 90° with respect to the chassis.
Figure 9:
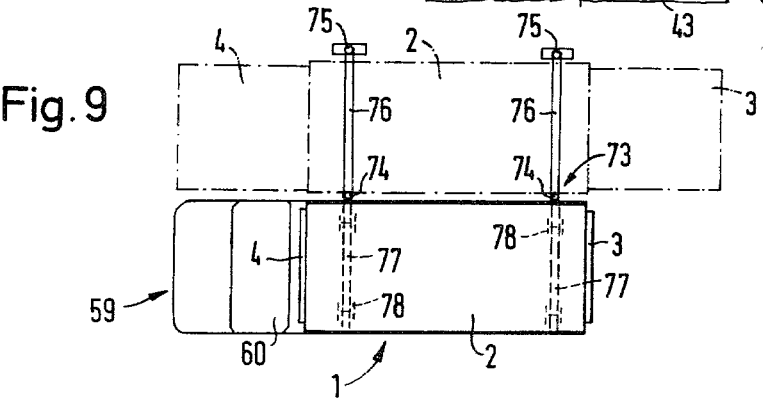
FIG. 9 is a schematic top view, at a smaller scale, of a modified embodiment of a van structure mounted on a self-propelled vehicle chassis, showing the transport position of the van structure in full lines and the operating position thereof in chain-dotted lines.

Another aspect of the present invention is illustrated in FIGS. 7 to 9. As shown in the drawing, van body 1 is mounted on a mobile chassis constituted in the illustrated embodiment by flat bed 61 of self-propelled truck 59 having driver's cab 60. The van body illustrated herein is generally of the same structure as hereinabove described and illustrated in FIGS. 1 to 6. According to this aspect of the invention, means for movingly mounting the main cabin floor on the chassis is substantially symmetrically disposed with respect to opposite ends 43 of main cabin 2 and enables van body 1 to be so moved in relation to the chassis that extension cabins 3 and 4 may be fully moved out of the main cabin laterally of the chassis. This arrangement enables the van to be universally used with various vehicles, including small trucks, track-bound carriages and the like. The indicated mounting means makes it possible to make full use of the two extension cabins even during a short break in the transportation of the van from one permanent location to another since the extension cabins may readily be moved in relation to the chassis so that they may be extended laterally thereof without hindrance. Such a mounting means may also be readily dismantled so that the van body may be removed from the chassis entirely and the self-propelled truck may be used for other purposes.

Two useful embodiments of mounting means according to this invention are illustrated in the drawing. FIGS. 7 and 8 show the mounting means to comprise turntable means 63 supporting the main cabin floor centrally between opposite ends 43 of main cabin 2. The preferred and illustrated turntable means comprises a first part affixed to the floor of the main cabin and a second part clamped to the chassis and movingly supporting the first part. The second part is a guide plate 66 detachably affixed to flat bed 61 of the mobile chassis by bolts 62 while the first part comprises guide plate 65 rollingly supported on guide plate 66 by roller bearing 67, the two guide plates of the turntable being interconnected by axially extending pin 64. Guide and clamping device 68 affixes guide plate 65 to the main cabin floor. This device may be constituted by mechanically operable grippers, bayonet locks or like detachable clamping means mounting guide plate 65 of the turntable on the floor 21 of the main cabin. Vertically adjustable and retractable supports 69 at each corner of main cabin 2 are associated with the main cabin for supporting van body 1 when it is moved in relation to the chassis. The illustrated supports are fluid pressure operated jacks consisting of cylinders 70 and piston rods slidably therein, support shoes 71 being attached to the outer ends of the piston rods for support on the ground. The jacks may be hydraulically or pneumatically operated.

This mounting is readily adaptable to various vehicles and, with minor adjustments, enables the van body to be readily mounted on the vehicle. With the adjustable supports, the van may be maintained at any desired level above ground so that the van may be entered without the need for ladders or other access means when it is moved laterally of the supporting chassis, as will be described hereinafter in connection with another embodiment of the mounting means. The detachable clamping of the mounting means is particularly useful for mobile homes which are rarely moved.

The transport position of van body 1 is illustrated in the drawing in chain-dotted lines, the van cabins extending in this position in the direction of the longitudinal axis of the mobile chassis on which the van is mounted. When the van is halted and it is desired to make full use of the interior by extending cabins 3 and 4, turntable 63 is operated to turn the van body by 90° into the operating position shown in FIG. 8. In this position, supports 69 at ends 43 of the main cabin are lowered into their support position to support the van body with its extended side cabins on the ground. With this arrangement, the length of the van body may be reduced to a minimum during transport while it may be extended to a maximum length in a very simple manner and rapidly by turning the van body by 90° and pulling out extension cabins 3 and 4.

In the embodiment of FIG. 9, mounting means 73 comprises a pair of transversely extending guide means 76, 77 adjacent a respective main cabin end 43 for laterally moving van body 1 in relation to the chassis. The illustrated guide means comprises guide tracks 76 pivoted to one side of the mobile chassis at vertical pivot 74, the ends of the guide tracks opposite to the pivoted end carrying vertically adjustable supports 75, which may be of the same type as supports 69. The guide means further comprises guide tracks 77 affixed to the mobile chassis. As shown in the drawing, when it is desired to move the van body laterally off the mobile chassis, guide tracks 76 are pivoted about pivots 74 until they are in alignment with guide tracks 77. The van body carries wheels 78, which may be double-flanged rollers, engaging guide tracks 77. When the van body is to be displaced laterally, it is simply wheeled along aligned guide tracks 77, 76 into the position shown in chain-dotted lines. By suitably adjusting the height of supports 75, guide tracks 76 may be inclined to provide an unloading ramp for the van body.

As shown in FIG. 8, a central pressure fluid source 72 may be mounted on main cabin 2 for supplying pressure fluid to the vertically adjustable supports so that these supports may be operated independently of the mobile chassis and the van body may be adjusted to various desired levels above ground after it has been dismounted from vehicle 59 and the latter has been removed. Thus, the van has its own power source and may be moved onto another vehicle on its own power.

While the invention has been described and illustrated in connection with a mobile home or camping van, the van structure may also be used as emergency housing independently of a vehicle, as a mobile workshop, office, emergency hospital and the like. Various modifications of structural details may occur to those skilled in the art, particularly after benefitting from the present teaching, without departing from the spirit and scope of this invention as defined in the appended claims.

What is claimed is:
1. A van structure comprising
   (a) a box-like main cabin having a floor, two side walls and a roof, the opposite ends of the main cabin being open,
   (b) two box-like extension cabins each having a floor, two side walls, a roof and an end wall interconnecting the side walls, an open end of each extension cabin opposite the end wall thereof being received in a respective one of the open ends of the main cabin,
   (c) longitudinally extending guide means slidingly guiding the extension cabins for sliding movement relative to the main cabin and to each other whereby the extension cabins may be telescopingly moved into and out of the main cabin,
   (d) means for moving the extension cabins out of the main cabin under a tensile force, and
   (e) a utility unit in the main cabin centered between the opposite ends thereof and constituting a vertically extending separation substantially parallel to the opposite open ends and dividing the main cabin into two compartments, the utility unit including
      (1) two load-bearing carrier elements affixed to the main cabin and spaced from each other in a longitudinal direction and facing the two open ends of the main cabin, the moving means being anchored to the carrier elements and the carrier elements being capable of sustaining the tensile force,
      (2) two transverse walls extending perpendicularly to the side walls of the main cabin and supported by the carrier elements, the transverse walls defining a space with one of the main cabin side walls sufficient to permit passage of a person,
      (3) a wash room facility arranged between the transverse walls,
      (4) a kitchen facility and
      (5) a storage facility, the transverse walls constituting rear walls for the kitchen and storage facilities, respectively, the kitchen and storage facilities facing the respective open ends of the main cabin.

2. The van structure of claim 1, wherein the moving means comprise a pulley arrangement for each extension cabin respectively mounted on the carrier elements.

3. The van structure of claim 1, wherein the storage facility includes closet means associated with a respective one of the transverse walls.

4. The van structure of claim 3, wherein the kitchen and storage facilities are spaced a sufficient distance from the side walls of the main cabin to permit the side walls of the extension cabins to be received therebetween.

5. The van structure of claim 4, wherein the distance is sufficient for accommodating furniture respectively associated with the side walls of the extension cabins and with the kitchen facilities.

6. The van structure of claim 1, wherein the length of each extension cabin in the longitudinal direction of the main cabin corresponds substantially to the distance between the carrier elements and the open ends of the main cabin facing the same.

7. The van structure of claim 1, wherein the distance between the carrier elements and the open ends of the main cabin facing the same exceeds the length of the extension cabins in the longitudinal direction of the main cabin telescopingly movable into the main cabin.

8. The van structure of claim 1, further comprising a seating furniture arrangement in one of the extension cabins and a sleeping furniture arrangement in the other extension cabin.

9. The van structure of claim 8, wherein the seating furniture arrangements comprises seats mounted on each one of the side walls of the one extension cabin and convertible to beds.

10. The van structure of claim 1, further comprising a door substantially parallel to the one side wall of the main cabin and at a distance therefrom corresponding to said space, and a wash basin arranged adjacent the other side wall of the main cabin, the kitchen facility being arranged adjacent one of the transverse walls and projecting into one of the compartments, the kitchen facility including dish washing means, cooking means and food refrigerating means, and the storage facilities including closet means adjacent the other transverse wall and projecting into the other compartment.

11. The van structure of claim 10, wherein the kitchen facility further includes a cabinet mounted on the one transverse wall above the dish washing and cooking means, and a cabinet bar, a pivot adjacent the one transverse wall supporting one end of the cabinet bar for pivoting the cabinet bar between an operating position wherein the cabinet bar extends along the other side wall of the main cabin and a transport position wherein the cabinet bar extends along the one transverse wall between the cabinet and the dish washing and cooking means.

12. The van structure of claim 10, wherein the wash room facility further includes a shower stall and a water closet arranged between the wash basin and the door.

13. The van structure of claim 12, further comprising a load-bearing false floor, support elements supporting the false floor on the floor of the main cabin between the transverse walls, the main cabin floor and the false floor defining a space therebetween, the false floor including a recessed area constituting a floor for the shower stall, water connection and fastening means for the water closet, the water basin and the shower stall mounted on the false floor, and a water tank and water conduit means connecting the water tank to the water connection means arranged in the space between the main cabin floor and the false floor.

14. The van structure of claim 13, wherein the false floor and the support elements therefor constitute an integral structural unit.

15. The van structure of claim 13, wherein a portion of the false floor constitutes wall portions of the water tank adjacent the recessed false floor area, and a plurality of spacing elements affixing a bottom wall portion of the water tank to the false floor portion.

16. The van structure of claim 15, wherein the spacing elements have one of their ends affixed to the false floor, the opposite ends of the spacing elements passing through the bottom wall portion and extending in contacting and supporting relationship therewith, the opposite spacing element ends being fluid-tightly connecting with the bottom wall portion.

17. The van structure of claim 1, wherein the wash room facility includes a wash basin arranged adjacent the other side wall of the main cabin, and further comprising a storage room underneath the wash basin and accessible through the other side wall from the outside of the van structure, the storage room containing energy sources for use in the van structure.

18. The van structure of claim 1, wherein the longitudinally extending guide means and the means for moving the extension cabins comprise a pulley arrangement for each extension cabin respectively mounted on the carrier elements and flexible tensile elements trained over each pulley arrangement and extending longitudinally along the side walls of the main cabin, the carrier elements being in force-transmitting connection with the side walls and the roof of the main cabin.

19. The van structure of claim 1, further comprising an undercarriage supporting the main cabin for wheeled movement, the undercarriage being arranged in vertical alignment with the utility unit and therebelow, a tractor and means coupling the undercarriage to the tractor.

20. A van structure comprising (a) a mobile chasis,
(b) a van body mounted on the chassis, the van body consisting of
  (2) a box-like main cabin having a floor supported on the chassis, two side walls and a roof, the opposite ends of the main cabin being open,
  (2) two box-like extension cabins each having a floor, two side walls, an open end of each extension cabin opposite the end wall thereof being received in a respective one of the open ends of the main cabin,
  (3) longitudinally extending guide means slidingly guiding the extension cabins for sliding movement relative to the main cabin and to each other whereby the extension cabins may be telescopingly moved into and out of the main cabin, and
  (4) means for moving the extension cabins out of the main cabin under tensile force, and
(c) means for movingly mounting the main cabin floor on the chassis, the mounting means being substantially symmetrical with respect to the opposite ends of the main cabin and enabling the van body to be so moved in relation to the chassis that the extension cabins may be fully moved out of the main cabin laterally of the chasis, and the mounting means comprising a turntable means supporting the main cabin floor centrally between the opposite ends of the main cabin.

21. The van structure of claim 20, wherein the mounting means comprises a pair of transversely extending guide means adjacent a respective one of the opposite main cabin ends for laterally moving the van body in relation to the chassis.

22. The van structure of claim 10 or 21, wherein the mounting means comprises a first part affixed to the floor of the main cabin and a second part clamped to the chassis and movingly supporting the first mounting means part, and further comprising vertically adjustable and retractable supports associated with the main cabin for supporting the van body when it is moved in relation to the chassis.

23. The van structure of claim 22, wherein the supports are pressure fluid operated jacks.

24. The van structure of claim 20 or 21, further comprising a utility unit in the main cabin centered between the opposite ends thereof and constituting a vertically extending separation substantially parallel to the opposite open ends and dividing the main cabin into two compartments, the utility unit defining a space with one of the side walls of the main cabin sufficient to permit passage of a person and including
  (1) two load-bearing carrier elements affixed to the main cabin and spaced from each other in a longitudinal direction and facing the two open ends of the main cabin, the moving means being anchored to the carrier elements and the carrier elements being capable of sustaining the tensile force,
  (2) a wash room facility
  (3) a kitchen facility and
  (4) a storage facility.

* * * * *